(No Model.)

E. A. LEWIS.
Bicycle.

No. 242,784.        Patented June 14, 1881.

Attest.
Emil S. Boyd
Charles Pickles

Inventor.
Edward A. Lewis
by C. D. Moody
atty

UNITED STATES PATENT OFFICE.

EDWARD A. LEWIS, OF ST. LOUIS, MISSOURI.

BICYCLE.

SPECIFICATION forming part of Letters Patent No. 242,784, dated June 14, 1881.

Application filed December 20, 1880. (No model.)

*To all whom it may concern:*

Be it known that I, EDWARD A. LEWIS, of St. Louis, Missouri, have made a new and useful Improvement in Bicycles, of which the following is a full, clear, and exact description, reference being had to the annexed drawings, making part of this specification, in which—

Figure 1:
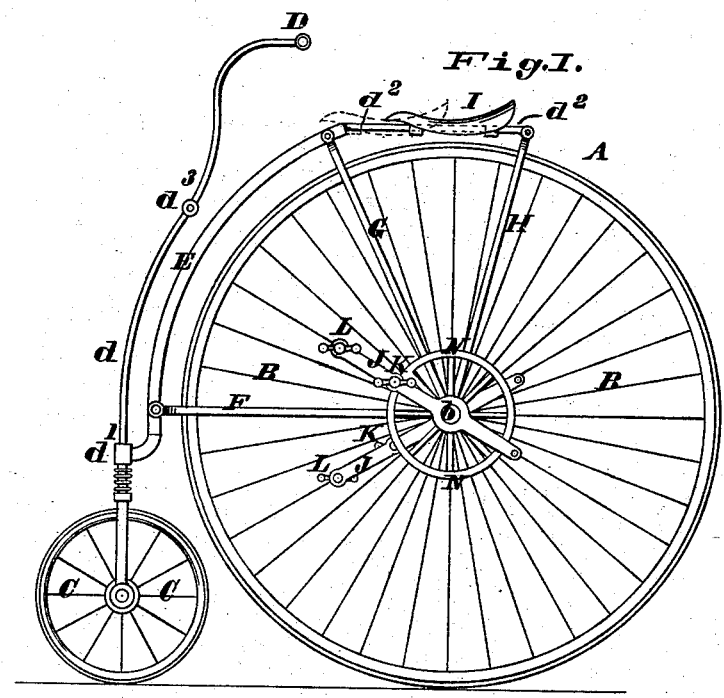
Figure 2:
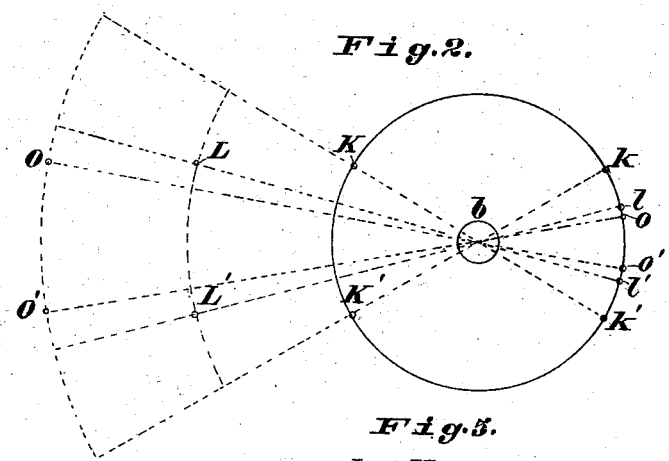
Figure 3:
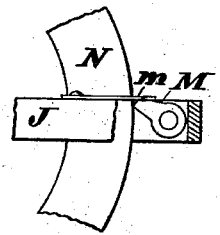
Figure 4:
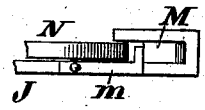
Figure 5:
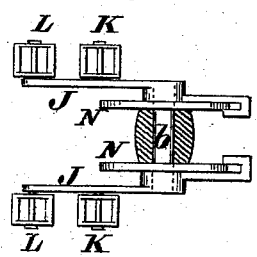

Figure 1 is a side elevation of a bicycle having the improvement; Fig. 2, a diagram explanatory of the working of a portion of the improvement; and Figs. 3, 4, 5, details, being respectively a side elevation, partly in section, upon an enlarged scale, showing the rear end of one of the pedal-levers and parts immediately therewith connected, a top view of the last-described mechanism, and a plan of the pedals and parts immediately therewith connected.

The same letters denote the same parts.

More power obviously is required in propelling a bicycle upon an ascending grade or a rough way than upon a level or smooth ground. It is desirable, then, to be able to increase the propelling-power as occasion may require. To this end, and also to provide for adjusting the position of the rider to the point of application of the power, is the aim of the present improvement, which consists in constructing the pedal mechanism so that the power can be applied nearer to or farther from the center of the driving-wheel, as desired, and in making the rider's seat to slide freely upon the bicycle, so that as the point of applying the power is changed the position of the rider can be correspondingly changed and without requiring him to dismount. At the same time the tiller is made adjustable to enable the relative position of the seat and tiller to be maintained.

Referring to the drawings, A represents a bicycle, which, saving the present improvement, may be of the usual construction.

B represents the driving-wheel, and C the steering-wheel, arranged forward of the large wheel and carrying the tiller D. The wheels are suitably connected by the reach E, which extends from the tiller-post $d$ at $d'$, where the post is journaled in the reach, upward and backward over the driving-wheel, being connected with the latter by means of suitable arms F G H, and at its upper end made to form or support a bearing, $d^2$, upon which the rider's seat I rests and is arranged to slide forward and backward, as indicated by the dotted lines in Fig. 1.

J J represent the pedal-levers. They are attached to and made to be moved in a reciprocating rotary movement upon the driving-wheel shaft $b$, the power being applied to the pedals K K L L, and the reciprocating movements of the pedals being communicated to the driving-wheel, and the latter thereby rotated as follows: The pedal-levers are extended backward beyond the shaft $b$, and the extensions are provided with dogs M M, which, as the pedals are depressed and the pedal-lever extensions thrown upward, catch upon pulleys N N, which are fastened to the shaft $b$, thereby for the time binding the pedal-levers and wheel B, and causing the latter to turn as the pedals are lifted, which can be effected by suitable means not now shown. The dogs ride backward upon the pulleys N N, leaving meanwhile the driving-wheel free to rotate.

Springs $m$ $m$ may be used to keep the points of the dogs in position for catching upon the pulleys as the pedals are depressed. I do not, however, lay claim to the means used in connecting the pedal mechanism and driving-wheel, the improvement relating rather to the sliding seat I, and, in connection therewith, an adjustable tiller and the means for applying more or less power to the pedal-levers, as desired. This is effected as follows: When less power is needed, as upon level ground, the rider's feet are applied nearer to the center of the driving-wheel—say to the inner pedals, K K—and when the power is thus applied the seat I is moved to the rear end of the bearing $d^2$. When more power is required, as upon an ascending grade, the feet are applied farther from the center of the driving-wheel, as to the outer pedals, L L, and in this case the seat I should be moved forward so as to preserve the proper relative position of the rider and the point of applying the power, it being understood that to secure the best results the rider must be well over the pedals. To enable the relative position of the tiller and seat I to be maintained the tiller-post is jointed at $d^3$, and when the seat is moved forward the upper end of the tiller-post is turned on the joint $d^3$ correspondingly forward.

The series of pedals can be of any suitable number—two, three, or more—at increasing distances from the shaft $b$, can be employed as desired, and in place of a series, K L, of pedals a single extended pedal, or a sliding or telescoping pedal, can be used. I prefer the form shown.

Wherever the point of applying the power may be—whether, for instance, to the pedals K K or L L—the rider's feet travel the same distance. Consequently, while power is gained by increasing the leverage upon the pedal-levers, there is a corresponding shortening of the distance through which the lever-extensions and pulleys N N move together. This is illustrated in the diagram, Fig. 2, where $b$ is the position of the driving-wheel shaft, K the position of the pedals K K, L the position of the pedals L L, and K K' and L L' the distances respectively moved over by the pedals K and the pedals L. These distances are the same; but the distance $l\, l'$ is shorter than the distance $k\, k'$, and if a third set of pedals, O, are used, moving over the arc O O', the distance $o\, o'$ would be still shorter than $l\, l'$.

The seat I can be fixed at any point on the bearing $d^2$ by any suitable means.

The present improvement is adaptable to other forms of the velocipede as well as bicycles.

A sliding seat is especially valuable in a bicycle having the steering-wheel in front of the main wheel, which supports the seat.

I am aware, in a bicycle, that a sliding seat and crank-levers having a series of pedals at increasing distances from the axle have been used; and

I claim—

The combination, in a bicycle or other form of velocipede, of a sliding seat, an adjustable tiller, and pedal-levers having a series of pedals at increasing distances from the axle, substantially as described, and for the purpose set forth.

EDWD. A. LEWIS.

Witnesses:
C. D. MOODY,
SAML. V. BOYD.